(12) United States Patent
Halliday et al.

(10) Patent No.: US 6,635,604 B1
(45) Date of Patent: Oct. 21, 2003

(54) LOW MOLECULAR WEIGHT WATER SOLUBLE ORGANIC COMPOUNDS AS CRYSTALLIZATION POINT SUPPRESSANTS IN BRINES

(75) Inventors: William S. Halliday, Cypress, TX (US); Dennis K. Clapper, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 263 days.

(21) Appl. No.: 09/666,726

(22) Filed: Sep. 20, 2000

Related U.S. Application Data

(63) Continuation-in-part of application No. 09/248,461, filed on Feb. 11, 1999, now abandoned.

(51) Int. Cl.⁷ ............................ C09K 7/02; C09K 3/00; E21B 43/16
(52) U.S. Cl. ...................... 507/136; 507/110; 507/131; 507/139; 507/209; 507/244; 507/261; 507/266; 166/305.1; 166/371
(58) Field of Search ................................ 507/110, 131, 507/136, 139, 209, 244, 261, 266; 166/305.1, 371

(56) References Cited

U.S. PATENT DOCUMENTS

| | | | |
|---|---|---|---|
| 2,690,814 A | 10/1954 | Reid | |
| 3,223,622 A | 12/1965 | Lummus et al. | |
| 3,348,614 A | 10/1967 | Sinclair et al. | |
| 4,230,587 A | 10/1980 | Walker | |
| 4,256,282 A | 3/1981 | Goldschild et al. | 251/58 |
| 4,456,067 A | 6/1984 | Pinner, Jr. | 166/279 |
| 4,465,601 A | 8/1984 | Pasztor, Jr. | |
| 4,466,486 A | 8/1984 | Walker | |
| 4,614,235 A | 9/1986 | Keener et al. | |
| 4,758,357 A | 7/1988 | Hoff | 252/8.551 |
| 4,780,220 A | 10/1988 | Peterson | 252/8.514 |
| 4,799,962 A | 1/1989 | Ahmed | 106/188 |
| 4,830,765 A | 5/1989 | Perricone et al. | 252/8.51 |
| 4,856,593 A | 8/1989 | Matthews et al. | 106/310 |
| 4,915,176 A | 4/1990 | Sugier et al. | 166/371 |
| 4,941,981 A | 7/1990 | Perricone et al. | 252/8.51 |
| 4,958,685 A | 9/1990 | Hihara et al. | 166/291 |
| 4,963,273 A | 10/1990 | Perricone et al. | 252/8.51 |
| 5,007,489 A | 4/1991 | Enright et al. | 175/65 |
| 5,008,026 A | 4/1991 | Gardner et al. | 252/8.553 |
| 5,057,234 A | 10/1991 | Bland et al. | 252/8.51 |
| 5,072,794 A | 12/1991 | Hale et al. | 175/50 |
| 5,076,364 A | 12/1991 | Hale et al. | 166/310 |
| 5,092,405 A | 3/1992 | Prukop | 166/272 |
| 5,099,930 A | 3/1992 | Enright et al. | 175/65 |
| 5,114,598 A | 5/1992 | Rayborn et al. | 307/126 |
| 5,120,708 A | 6/1992 | Melear et al. | 507/126 |
| 5,141,920 A | 8/1992 | Bland et al. | 507/136 |
| 5,198,415 A | 3/1993 | Steiger | 507/103 |
| 5,198,416 A | 3/1993 | Hale et al. | 507/136 |
| 5,248,664 A | 9/1993 | Hale et al. | 507/136 |
| 5,248,665 A | 9/1993 | Hale et al. | 507/136 |
| 5,607,901 A | 3/1997 | Toups, Jr. et al. | 507/103 |
| 5,635,458 A | 6/1997 | Lee et al. | 507/240 |
| 5,643,858 A * | 7/1997 | Woolley | 420/415 |
| 5,658,860 A | 8/1997 | Clark et al. | |
| 5,723,524 A | 3/1998 | Cohen et al. | 524/375 |
| 5,741,758 A | 4/1998 | Pakulski | 307/90 |
| 6,080,704 A | 6/2000 | Halliday et al. | |
| 6,093,862 A * | 7/2000 | Sinquin et al. | 137/13 |
| 6,165,945 A | 12/2000 | Halliday et al. | |
| 6,173,780 B1 * | 1/2001 | Collins et al. | 166/300 |

FOREIGN PATENT DOCUMENTS

| | | |
|---|---|---|
| CA | 2058856 | 7/1992 |
| EP | 0526929 * | 2/1993 |
| EP | 0 369 692 B1 | 5/1993 |
| GB | 2 245 292 A | 1/1992 |
| GB | 2 251 447 A | 7/1992 |
| WO | WO 94/24413 | 10/1994 |
| WO | WO 96/04348 | 2/1996 |
| WO | WO 96/22451 | 7/1996 |

OTHER PUBLICATIONS

"Investigation of Natural Gas Hydrates In Varioius Drilling Fluids", D.T. Lai and A.K. Dzialowski, M–1 Drilling Fluids Co, SPE/IADC 18637, SPE/IADC Drilling Conference, 1989.

* cited by examiner

Primary Examiner—Jill Warden
Assistant Examiner—LaToya Cross
(74) Attorney, Agent, or Firm—Paula D. Morris & Associates, P.C.

(57) ABSTRACT

A brine for use during drilling operations, preferably a completion brine, comprising an amount of a low molecular weight water-soluble organic compound effective to reduce the crystallization point of the brine. The low molecular weight water soluble organic compound can be a variety of compounds, with preferred compounds being ethylene glycol, tripropylene glycol bottoms, and combinations thereof. A method of lowering the crystallization point of the brine using a low molecular weight water soluble organic compound also is provided.

81 Claims, 6 Drawing Sheets

| 1 %Wt | 2 Specific Gravity | 3 Density (lb$_m$/gal) | 4 NaCl (lb$_m$/bbl) | 5 H$_2$O (gal/bbl) | 6 NaCl (mg/L) | 7 Chlorides (mg/L) | 8 Vol. Incr. Factor | 9 Crystallization Point (T) | 10 A$_w$ |
|---|---|---|---|---|---|---|---|---|---|
| 1.0 | 1.007 | 8.40 | 3.5 | 41.87 | 10,070 | 6,108 | 1.003 | 31.0 | 0.996 |
| 2.0 | 1.014 | 8.46 | 7.1 | 41.75 | 20,286 | 12,305 | 1.006 | 30.0 | 0.989 |
| 3.0 | 1.021 | 8.52 | 10.7 | 41.63 | 30,630 | 18,580 | 1.009 | 28.8 | 0.983 |
| 4.0 | 1.029 | 8.58 | 14.4 | 41.46 | 41,144 | 24,957 | 1.013 | 27.7 | 0.976 |
| 5.0 | 1.036 | 8.65 | 18.2 | 41.34 | 51,800 | 31,421 | 1.016 | 26.5 | 0.970 |
| 6.0 | 1.043 | 8.70 | 21.9 | 41.10 | 62,586 | 37,963 | 1.020 | 25.3 | 0.964 |
| 7.0 | 1.050 | 8.76 | 25.8 | 41.02 | 73,500 | 44,584 | 1.024 | 24.1 | 0.957 |
| 8.0 | 1.058 | 8.83 | 29.7 | 40.86 | 84,624 | 51,331 | 1.028 | 22.9 | 0.950 |
| 9.0 | 1.065 | 8.89 | 33.6 | 40.70 | 95,850 | 58,141 | 1.032 | 21.5 | 0.943 |
| 10.0 | 1.073 | 8.95 | 37.6 | 40.54 | 107,260 | 65,062 | 1.036 | 20.2 | 0.935 |
| 11.0 | 1.080 | 9.01 | 41.6 | 40.38 | 118,800 | 72,062 | 1.040 | 18.8 | 0.927 |
| 12.0 | 1.088 | 9.08 | 45.7 | 40.19 | 130,512 | 79,166 | 1.045 | 17.3 | 0.919 |
| 13.0 | 1.095 | 9.14 | 49.9 | 40.00 | 142,350 | 86,347 | 1.050 | 15.7 | 0.910 |
| 14.0 | 1.103 | 9.20 | 54.1 | 39.85 | 154,392 | 93,651 | 1.054 | 14.1 | 0.901 |
| 15.0 | 1.111 | 9.27 | 58.4 | 39.66 | 166,650 | 101,087 | 1.059 | 12.4 | 0.892 |
| 16.0 | 1.118 | 9.33 | 62.7 | 39.44 | 178,912 | 108,524 | 1.065 | 10.6 | 0.882 |
| 17.0 | 1.126 | 9.40 | 67.1 | 39.25 | 191,420 | 116,112 | 1.070 | 8.7 | 0.872 |
| 18.0 | 1.134 | 9.46 | 71.5 | 39.03 | 204,102 | 123,804 | 1.076 | 6.7 | 0.861 |
| 19.0 | 1.142 | 9.53 | 76.0 | 38.85 | 216,980 | 131,616 | 1.081 | 4.6 | 0.850 |
| 20.0 | 1.150 | 9.60 | 80.6 | 38.64 | 229,960 | 139,489 | 1.087 | 2.4 | 0.839 |

*FIG. 1A*

| 1 % Wt | 2 Specific Gravity | 3 Density (lb$_m$/gal) | 4 NaCl (lb$_m$/bbl) | 5 H$_2$O (gal/bbl) | 6 NaCl (mg/L) | 7 Chlorides (mg/L) | 8 Vol. Incr. Factor | 9 Crystallization Point (T) | 10 A$_w$ |
|---|---|---|---|---|---|---|---|---|---|
| 21.0 | 1.158 | 9.66 | 85.2 | 38.43 | 243,180 | 147,508 | 1.09 | 0.0 | 0.827 |
| 22.0 | 1.166 | 9.73 | 89.9 | 38.22 | 256,520 | 155,600 | 1.099 | -2.5 | 0.815 |
| 23.0 | 1.174 | 9.80 | 94.6 | 37.97 | 270,020 | 163,789 | 1.106 | -5.2 | 0.802 |
| 24.0 | 1.183 | 9.87 | 99.5 | 37.74 | 283,800 | 172,147 | 1.113 | +11.4 | 0.788 |
| 25.0 | 1.191 | 9.94 | 104.4 | 37.50 | 297,750 | 180,609 | 1.120 | +15.0 | 0.774 |
| 26.0 | 1.199 | 10.01 | 109.3 | 37.27 | 311,818 | 189,143 | 1.127 | +25.0 | 0.759 |

METRIC CONVERSIONS:

NaCl (g/L) = NaCl (lb$_m$/ft) × 2.85714

H$_2$O (ml/L) = H$_2$O (gal/bbl) × 23.8086

NaCl (ppm) = % wt × 10,000

Cl$^-$ (mg/L) = NaCl (mg/L) × 0.6066

NaCl (mg/L) = Cl$^-$ (mg/L) × 1.65 mg/L = ppm × specific gravity;

FORMULAS:

Salt (lb$_m$/bbl water) = Volume increase factor × NaCl (lb$_m$/bbl)

Specific gravity = 1.0036(0.99707+6.504(10$^{-3}$) (% wt NaCl) +4.395(10$^{-5}$) (% wt NaCl)$^2$) or 1 + 1.94(10$^{-6}$) (Cl$^-$, mg/L)$^{0.95}$ Volume increase factor = 1.00045 + 2.72232(10$^{-3}$) (%wt NaCl) +8.15591(10$^{-5}$) (% wt NaCl)$^2$ or 1 + 5.88(10$^{-8}$) (Cl$^-$, mg/L)$^{1.2}$ A$_w$ = 0.99755 - 4.3547(10$^{-3}$) (% wt NaCl) - 1.8205(10$^{-4}$) (% wt NaCl)$^2$

FIG. 1B

| 1 Percent Wt | 2 Specific Gravity | 3 Density (lbm/gal) | 4 KCl (lbm/bbl) | 5 H2O (gal/bbl) | 6 KCl (mg/L) | 7 Chlorides (mg/L) | 8* Vol. Incr. Factor | 9 Crystallization Point (T) |
|---|---|---|---|---|---|---|---|---|
| 1.0 | 1.005 | 8.37 | 3.5 | 41.8 | 10,000 | 4,756 | 1.005 | 31.2 |
| 2.0 | 1.011 | 8.42 | 7.1 | 41.6 | 20,200 | 9,606 | 1.009 | 30.3 |
| 3.0 | 1.017 | 8.47 | 10.7 | 41.4 | 30,500 | 14,506 | 1.013 | 29.5 |
| 4.0 | 1.024 | 8.53 | 14.4 | 41.3 | 41,000 | 19,499 | 1.017 | 28.6 |
| 5.0 | 1.030 | 8.59 | 18.1 | 51.1 | 51,500 | 24,493 | 1.022 | 27.8 |
| 6.0 | 1.037 | 8.64 | 21.8 | 40.9 | 62,200 | 29,582 | 1.026 | 26.9 |
| 7.0 | 1.044 | 8.69 | 25.6 | 40.7 | 73,000 | 34,718 | 1.031 | 26.1 |
| 8.0 | 1.050 | 8.75 | 29.4 | 40.5 | 84,000 | 39,950 | 1.035 | 25.2 |
| 9.0 | 1.057 | 8.80 | 33.3 | 40.4 | 95,100 | 45,229 | 1.039 | 24.3 |
| 10.0 | 1.063 | 8.86 | 37.3 | 40.2 | 106,300 | 50,556 | 1.045 | 23.4 |
| 11.0 | 1.070 | 8.90 | 41.2 | 40.0 | 117,700 | 55,977 | 1.050 | 22.4 |
| 12.0 | 1.077 | 8.97 | 45.3 | 39.8 | 129,200 | 61,447 | 1.055 | 21.4 |
| 13.0 | 1.084 | 9.03 | 49.4 | 39.6 | 140,900 | 67,011 | 1.061 | 20.4 |
| 14.0 | 1.091 | 9.08 | 53.5 | 39.4 | 152,700 | 72,623 | 1.066 | 20.0 |
| 15.0 | 1.097 | 9.12 | 57.6 | 39.1 | 164,600 | 78,282 | 1.072 | 18.5 |
| 16.0 | 1.104 | 9.20 | 61.9 | 38.9 | 176,700 | 84,038 | 1.078 | 17.0 |
| 17.0 | 1.111 | 9.26 | 66.1 | 38.7 | 188,900 | 89,840 | 1.084 | 16.0 |
| 18.0 | 1.119 | 9.32 | 70.5 | 38.5 | 201,300 | 95,737 | 1.090 | 15.0 |
| 19.0 | 1.126 | 9.38 | 74.9 | 38.3 | 213,900 | 101,730 | 1.097 | 14.0 |
| 20.0 | 1.111 | 9.44 | 79.3 | 38.0 | 226,600 | 107,770 | 1.104 | 13.0 |

*Sacked KCl contains a trivial amount of water, therefore, the vol. increase from sack additions is the same as the retort corrections factor.

FIG. 2A

| 1 Percent Wt | 2 Specific Gravity | 3 Density (lb$_m$/gal) | 4 KCl (lb$_m$/bbl) | 5 H$_2$O (gal/bbl) | 6 KCl (mg/L) | 7 Chlorides (mg/L) | 8 Vol. Incr. Factor | 9 Crystallization Point (T) |
|---|---|---|---|---|---|---|---|---|
| 21.0 | 1.140 | 9.51 | 83.9 | 37.8 | 239,500 | 114,000 | 1.111 | 22.0 |
| 22.0 | 1.147 | 9.56 | 88.4 | 37.6 | 252,400 | 120,040 | 1.117 | 34.0 |
| 23.0 | 1.155 | 9.64 | 93.1 | 37.4 | 265,700 | 126,473 | 1.125 | 48.0 |
| 24.0 | 1.162 | 9.68 | 97.7 | 37.1 | 278,900 | 132,643 | 1.132 | 59.0 |

METRIC CONVERSIONS:
KCl (g/L) = KCl (lb$_m$/bbl) x 2.85714
H$_2$O (ml/L) = H$_2$O (gal/bbl) x 23.8086
KCl (ppm) = % wt x 10,000
mg/L = ppm x specific gravity
Cl$^-$ (mg/L) = KCl (mg/L) x 0.476
KCl (mg/L) = Cl$^-$ (mg/L) x 2.101
K$^+$ (mg/L) = Cl$^-$ (mg/L) x 1.103
Cl$^-$ (mg/L) = K$^+$ (mg/L) x 0.907

FORMULAS:
Salt (lb$_m$/bbl water) = Volume increase factor x Kl (lb$_m$/bbl)
Specific gravity = 1.00056 + 1.22832(10$^{-6}$) (Cl$^-$, mg/L)
Volume increase factor = 1 + (2.775 x 10$^{-7}$) (Cl$^-$)$^{1.105}$

*FIG. 2B*

| Density (lb$_m$/gal) | bbl Water per bbl Brine | bbl KBr per bbl Brine | % KBr | Crystallization Point, °F (LCTD) |
|---|---|---|---|---|
| 8.3 | 1.000 | - | - | 32 |
| 8.6 | 0.985 | 15.1 | 4.2 | 30 |
| 8.7 | 0.980 | 21.9 | 6.0 | 30 |
| 8.8 | 0.974 | 28.1 | 7.6 | 29 |
| 8.9 | 0.967 | 34.8 | 9.3 | 28 |
| 9.0 | 0.962 | 40.8 | 10.8 | 27 |
| 9.1 | 0.956 | 47.0 | 12.3 | 27 |
| 9.2 | 0.954 | 52.6 | 13.6 | 26 |
| 9.3 | 0.947 | 58.6 | 15.0 | 26 |
| 9.4 | 0.942 | 64.7 | 16.4 | 25 |
| 9.5 | 0.937 | 70.6 | 17.7 | 24 |
| 9.6 | 0.932 | 76.6 | 19.0 | 23 |
| 9.7 | 0.928 | 82.3 | 20.2 | 22 |
| 9.8 | 0.922 | 88.5 | 21.5 | 22 |
| 9.9 | 0.916 | 94.8 | 22.8 | 21 |
| 10.0 | 0.911 | 100.8 | 24.0 | 19 |
| 10.1 | 0.905 | 106.9 | 25.2 | 18 |
| 10.2 | 0.901 | 112.7 | 26.3 | 17 |
| 10.3 | 0.895 | 119.0 | 27.5 | 16 |
| 10.4 | 0.888 | 125.4 | 28.7 | 15 |
| 10.5 | 0.883 | 131.4 | 29.8 | 14 |
| 10.6 | 0.878 | 137.6 | 30.9 | 12 |
| 10.7 | 0.872 | 143.8 | 32.0 | 13 |
| 10.8 | 0.865 | 150.6 | 33.2 | 20 |
| 10.9 | 0.858 | 157.0 | 34.3 | 27 |
| 11.0 | 0.854 | 162.6 | 35.2 | 33 |
| 11.1 | 0.847 | 169.2 | 36.3 | 41 |
| 11.2 | 0.842 | 175.5 | 37.3 | 49 |
| 11.3 | 0.835 | 181.2 | 38.3 | 57 |
| 11.4 | 0.829 | 188.2 | 39.3 | 66 |
| 11.5 | 0.824 | 194.2 | 40.2 | 75 |

Example:
To prepare 10 bbl of 10 lb/gal KBr:
10 x 0.911 = 9.1 bbl water; 10 x 100.8 = 1,008 lbs KBr
Add 1,008 lbs KBr to 9.1 bbl water.

*FIG. 3*

| ve* 10⁴ | Density lb/gal | Specific Gravity @ 68°F | bbl 11.6 CaCl₂ per bbl Brine | bbl Water per bbl Brine | Crystallization Point °F | Weight % CaCl₂ |
|---|---|---|---|---|---|---|
|  | 8.4 | 1.01 | 0.022 | 0.978 | +31 | 1.0 |
|  | 8.5 | 1.02 | 0.052 | 0.948 | +30 | 2.0 |
|  | 8.6 | 1.03 | 0.083 | 0.917 | +28 | 4.0 |
|  | 8.7 | 1.04 | 0.113 | 0.887 | +27 | 5.0 |
|  | 8.8 | 1.06 | 0.144 | 0.856 | +25 | 6.0 |
|  | 8.9 | 1.07 | 0.174 | 0.826 | +23 | 7.0 |
| 3.33 | 9.0 | 1.08 | 0.203 | 0.797 | +21 | 9.0 |
|  | 9.1 | 1.09 | 0.233 | 0.767 | +19 | 10.0 |
|  | 9.2 | 1.10 | 0.264 | 0.736 | +17 | 11.0 |
|  | 9.3 | 1.11 | 0.294 | 0.706 | +15 | 12.0 |
|  | 9.4 | 1.13 | 0.325 | 0.675 | +12 | 14.0 |
| 3.00 | 9.5 | 1.14 | 0.356 | 0.644 | +9 | 15.0 |
|  | 9.6 | 1.15 | 0.390 | 0.610 | +6 | 16.0 |
|  | 9.7 | 1.16 | 0.420 | 0.580 | +3 | 17.0 |
|  | 9.8 | 1.17 | 0.450 | 0.550 | -1 | 19.0 |
|  | 9.9 | 1.19 | 0.480 | 0.520 | -6 | 20.0 |

*FIG. 4A*

| ve* 10⁴ | Density lb/gal | Specific Gravity @ 68°F | bbl 11.6 CaCl₂ per bbl Brine | bbl Water per bbl Brine | Crystallization Point °F | Weight % CaCl₂ |
|---|---|---|---|---|---|---|
| 2.89 | 10.0 | 1.20 | 0.510 | 0.490 | -11 | 21.0 |
|  | 10.1 | 1.21 | 0.540 | 0.460 | -16 | 22.0 |
|  | 10.2 | 1.22 | 0.571 | 0.429 | -22 | 23.0 |
|  | 10.3 | 1.23 | 0.601 | 0.399 | -28 | 25.0 |
|  | 10.4 | 1.25 | 0.632 | 0.368 | -34 | 26.0 |
| 2.6 | 10.5 | 1.26 | 0.663 | 0.337 | -41 | 27.0 |
|  | 10.6 | 1.27 | 0.694 | 0.306 | -48 | 28.0 |
|  | 10.7 | 1.28 | 0.724 | 0.276 | -55 | 29.0 |
|  | 10.8 | 1.29 | 0.755 | 0.245 | -51 | 30.0 |
|  | 10.9 | 1.31 | 0.785 | 0.215 | -31 | 31.0 |
| 2.4 | 11.0 | 1.32 | 0.820 | 0.180 | -15 | 32.0 |
|  | 11.1 | 1.33 | 0.850 | 0.150 | 0 | 33.0 |
|  | 11.2 | 1.34 | 0.880 | 0.120 | +12 | 34.0 |
|  | 11.3 | 1.35 | 0.910 | 0.090 | +23 | 35.0 |
|  | 11.4 | 1.37 | 0.940 | 0.060 | +34 | 36.0 |
| 2.39 | 11.5 | 1.38 | 0.970 | 0.030 | +43 | 37.0 |
|  | 11.6 | 1.39 | 1.00 | 0.000 | +53 | 38.0 |

*FIG. 4B*

LOW MOLECULAR WEIGHT WATER SOLUBLE ORGANIC COMPOUNDS AS CRYSTALLIZATION POINT SUPPRESSANTS IN BRINES

The present application is a continuation-in-part of U.S. patent application Ser. No. 09/248,461, filed Feb. 11, 1999, abandoned.

FIELD OF THE INVENTION

The present invention relates to methods and compositions for suppressing crystallization in brines during drilling operations, particularly at high pressures and low temperatures. Preferred brines are completion fluids, most preferably clear brines.

BACKGROUND OF THE INVENTION

The petroleum industry continues to expand deepwater exploration and drilling efforts in many areas of the world. As drilling water depth increases, the potential for various problems also increases. One such problem is the crystallization of brines during drilling operations.

Clear brines commonly have been used in drilling operations since the 1970's, and are advantageous for many reasons. One advantage is that clear brines tend to minimize damage at high pressures. Clear brines commonly are used as completion fluids, perforating fluids, packer fluids, and in pay zone drill-in fluids.

Early use of clear brines during drilling operations quickly revealed a significant drawback—untimely crystallization of the salts in the brine, causing the salts to fall out of solution. The formation of crystallized solids in the work string can plug the workstring, causing expensive downtime and requiring that the plug be cleared. The crystalline solids also can conceal the presence of a gas bubble in the workstring below the crystallized solids. As the plugged lines are cleared, a concealed gas bubble can cause the well to blow out, resulting in loss of the entire rig.

Until recently, the pressure effect on crystallization has not presented a problem—even in exceptionally high pressure work. This is because the highest pressures typically have been encountered together with the highest temperatures, which reduces the risk of crystallization. However, a combination of high pressure and low temperature does occur in at least two cases: 1) when working in exceptionally deep waters where the hydrostatic pressure at the sea floor (mud-line) is combined with near freezing temperatures; and, 2) in colder climates, when conducting pressure tests of lines and similar equipment, such as blow-out preventers.

Previous methods used to cope with crystallization have not proven to be effective under all conditions. Brines are needed which effectively suppress crystallization under a wide variety of temperature and pressure conditions.

SUMMARY OF THE INVENTION

A brine comprising an aqueous solution comprising at least one salt at a density sufficient to crystallize out of the brine at a crystallization point comprising a given temperature and a given pressure, and a crystallization point suppressant consisting essentially of one or more low molecular weight water-soluble organic compounds other than methanol in an amount effective to suppress the crystallization point.

BRIEF DESCRIPTION OF THE DRAWINGS

FIGS. 1–4 compare the physical properties, including crystallization point, of various brines.

DETAILED DESCRIPTION OF THE INVENTION

The present invention involves the suppression of the "crystallization point" of a brine, preferably a completion brine. For purposes of the present application, the term "crystallization point" is defined as the pressure and temperature at which the salt in a brine crystallizes out of solution to form a solid. A crystallization point is suppressed if either the temperature may be lower at a given pressure or if the pressure may be higher at a given temperature before the first crystals of the salt begin to appear. A suppressed crystallization point also may sometimes be referred to herein as a "lower" crystallization point. Although empirical expressions for the crystallization point of brines exist, the industry relies generally on experimental measurement of the crystallization temperature at a constant pressure.

The crystallization point generally is measured by varying the temperature to which a brine is exposed at a given pressure. At a given pressure, crystallization will occur at a variety of temperatures depending upon the concentration or density of the salt in the brine. The pressures generally encountered by a brine during drilling operations are from about 500 psi to about 20,000 psi, typically from about 3000 psi to about 10,000 psi. Brine densities at which crystallization becomes an issue at these pressures, depending upon the temperature, are from about 9 to about 20 pounds per gallon, preferably from about 10 to about 15 pounds per gallon.

Each salt has its own pattern of crystallization point behavior dependent upon the type of salt, the salt concentration or density, and the pressure. FIGS. 1–4 give crystallization point ranges for a variety of salts without considering pressure effects. Pressure effects could shift the crystallization point ranges as much as 20° F. Murphey, J., et al. *"The Effect of Pressure on the Crystallization Temperature of High Density Brines,"* presented at the IADC/SPE Drilling Conference held in Dallas, Tex., Mar. 3–6, 1998 (esp. FIG. 11), incorporated herein by reference.

The following Table briefly summarizes the crystallization temperatures for to various brines having a density of from about 9 pounds per gallon to a maximum density (also designated) at atmospheric pressure:

| Brine | Crystallization Temp. Range (° F.) for 9 lb/gal. to Max Density (Atmospheric Pressure) | Maximum Density (lb/gal.) |
| --- | --- | --- |
| Potassium Bromide | 25 to 75 | 11.5 |
| Sodium Bromide | 25 to 63 | 12.6 |
| Sodium Chloride | 22 to 30 | 10 |
| Calcium Chloride | 21 to 60 | 11.6 |
| $CaBr_2/ZnBr_2$ | −20 (15 lb/gal) to 16 | 19.2 |
| Sodium Formate | 18 to 58 | 11 |
| Potassium Formate | 18 to 20 | 13 |

The present invention provides brines containing crystallization point-suppressants comprising "low molecular weight" water soluble organic compounds which are non-toxic, economical, and effective to suppress the crystallization point of brines during drilling, drill-in, and completion operations without adversely affecting the rheological and/or fluid loss control properties of the brine. The crystallization point-suppressors not only suppress the crystallization point of the brine, they also can help to inhibit hydration of shale in contact with the brine. The phrase "low molecular weight" has a different meaning for different types of compounds. For alcohols, the phrase "low molecular weight" is defined to mean a molecular weight up to about 800 atomic mass units for monomers and a molecular weight up to about 2000 atomic mass units for polymeric materials. For compositions other than alcohols, "low molecular weight" is defined to mean a molecular weight of up to about 400 atomic mass units, preferably from about 200 atomic mass units to about 400 atomic mass units.

The phrase "low molecular weight water-soluble organic compounds" also is defined to refer to "non-toxic" compositions meeting the applicable EPA requirements for discharge into U.S. waters. Currently, a drilling fluid must have an $LC_{50}$ (lethal concentration where 50% of the organisms are killed) of 30,000 parts per million (ppm) suspended particulate phase (SPP) or higher to meet the EPA standards. This standard may change with time.

Suitable crystallization point-suppressors for use in the invention include, but are not necessarily limited to organic alcohols other than methanol, polyols, glycols, polyglycols, polyalkyleneoxides, alkyleneoxide copolymers, alkylene glycol ethers, polyalkyleneoxide glycol ethers, carbohydrates and derivatives thereof, amino acids, amino sulfonates, alcohols comprising between about 1–3 carbon atoms, salts of any of the foregoing compounds, and combinations of the foregoing compounds. Preferred low molecular weight organic compounds are alcohols with a molecular weight up to about 200, and include, but are not necessarily limited to organic alcohols comprising from about 2 to about 3 carbon atoms, glycols comprising from about 2 to about 4 carbon atoms, and glycerols. Preferred alcohols are ethylene glycol and propylene glycol derivatives, most preferably ethylene glycol derivatives.

Examples of suitable glycols and polyglycols include, but are not necessarily limited to ethylene glycols, diethylene glycols, triethylene glycols, tetraethylene glycols, propylene glycols, dipropylene glycols, tripropylene glycols, and tetrapropylene glycols. Examples of suitable polyalkyleneoxides and copolymers thereof include, but are not necessarily limited to polyethylene oxides, polypropylene oxides, and copolymers of polyethylene oxides and polypropylene oxides. Suitable polyalkyleneoxide glycol ethers include, but are not necessarily limited to polyethylene glycol ethers, polypropylene glycol ethers, polyethylene oxide glycol ethers, polypropylene oxide glycol ethers, and polyethylene oxide/polypropylene oxide glycol ethers.

Suitable carbohydrates and derivatives include, but are not necessarily limited to saccharides and their derivatives. Suitable saccharides include, but are not necessarily limited to monosaccharides, such as fructose and glucose, disaccharides, and polysaccharides having a molecular weight less than about 800 atomic mass units, preferably less than 400 atomic mass units, and most preferably less than 200 atomic mass units. Suitable saccharide derivatives include, but are not necessarily limited to saccharides comprising an α-carbon comprising an -R substituent selected from the group consisting of a hydroxyl group, an alkoxy group comprising an alkyl group having from about 1 to about 6 carbon atoms, an alkenoxy group comprising an alkenyl group having from about 1 to about 6 carbon atoms, and an amine group comprising an organic component selected from the group consisting of alkyl groups and alkenyl groups having from about 1 to about 6 carbon atoms. Examples of such saccharide derivatives include methylglucosides, methylglucamines, and the like. Suitable alcohols include, but are not necessarily limited to ethanol, propanol, and isopropanol.

Suitable ethylene glycol derivatives include, but are not necessarily limited to ethylene glycol, polyethylene glycols, and ethylene glycol ethers having a total molecular weight of up to about 800, preferably up to about 200. A preferred ethylene glycol derivative is ethylene glycol. These materials are commodities which are commercially available from numerous sources well known to persons of ordinary skill in the art.

Suitable propylene glycol derivatives include, but are not necessarily limited to propylene glycol, polypropylene glycols, and polypropylene glycol ethers having a total molecular weight of up to about 800, preferably those having a total molecular weight of up to about 200. A preferred propylene glycol derivative is tripropylene glycol bottoms (TPGB) obtained from Dow USA. TPGB comprises 5–20 wt % tripropylene glycol (CAS # 001638-16-0) with a balance of polypropylene glycol highers (CAS #025322-69-4). Dow USA TPGB has the following physical properties:

| | |
|---|---|
| Boiling point: | 268° C. (515° F.) |
| Vapor pressure: | <0.01 mm Hg @ 20° C. |
| Vapor density: | >1 |
| Solubility in water: | Miscible |
| Specific Gravity: | 1.023 |
| Appearance: | Dark brown, viscous liquid |
| Odor: | Slight characteristic odor. |
| Flash point: | >140° C. (285° F.) |

Ethylene glycol and an ethylene glycol/TPGB blend have been found to meet the current EPA requirements for discharge into U.S. waters. As used herein, the term "non-toxic" is defined to mean that a material meets the applicable EPA requirements for discharge into U.S. waters. Currently, a drilling fluid must have an $LC_{50}$ (lethal concentration where 50% of the organisms are killed) of 30,000 parts per million (ppm) suspended particulate phase (SPP) or higher to meet the EPA standards. The mysid shrimp toxicity test for ethylene glycol resulted in an $LC_{50}$ of 970,000 ppm SPP—over 30 times the minimum EPA standard for discharge into coastal waters. The mysid shrimp toxicity test for an ethylene glycol/TPGB blend (65 wt %/35 wt %, respectively) resulted in an $LC_{50}$ of 200,000 ppm of the SPP—over 6 times the minimum EPA standard for discharge into coastal waters. Ethylene glycol and the blend have the added advantage that they produce no sheen on the receiving waters.

Substantially any brine may be treated according to the present invention. The brine should contain at least about 1 wt % of the organic crystallization point-suppressant, preferably at least about 10 wt %, more preferably in the range of from about 10 to about 80 wt %, and most preferably in the range of from about 10 to about 30 wt %.

The invention will be more clearly understood with reference to the following example, which is illustrative only and should not be construed as limiting the invention. In the Example, the crystallization point of the brine was determined using the standard procedure established by the American Petroleum Institute, described in API RP 13J, incorporated herein by reference.

EXAMPLE I

Two solutions were tested in this example: a control solution comprising a 20% w/w NaBr brine, and a test solution comprising the same brine with 20% w/w ethylene glycol. In accordance with RP13J, the solutions gradually were cooled through the expected temperature range. The temperature at which crystals were first observed was the First Crystal to Appear (FCTA) temperature. The mixtures later were warmed while observing the dissolution of the crystals. The temperature at which complete dissolution occurred was recorded as the Last Crystal to Dissolve (LCTD). Between the FCTA and the LCTD were the True Crystallization Temperatures (TCT). This temperature was most evident when some small amount of super cooling occurred before the FCTA. Thus, at the point of crystallization, an exotherm occurred which rapidly raised the temperature a few degrees in spite of the fact that the liquid was being cooled at that point.

The following were the results:

|  | 20% (w/w NaBr) | 20% (w/w) NaBr/20% (w/w) Ethylene Glycol |
|---|---|---|
| FCTA | 10° F. | −11° F. |
| LCTD | 18° F. | −8° F. |

Clearly, the addition of the ethylene glycol to the solution depressed the crystallization point of the solution.

Persons of ordinary skill in the art will appreciate that many modifications may be made to the embodiments described herein without departing from the spirit of the present invention. Accordingly, the embodiments described herein are illustrative only and are not intended to limit the scope of the present invention.

We claim:

1. A brine selected from the group consisting of a completion fluid, a perforating fluid, a packer fluid, and a drill-in fluid comprising:
   an aqueous solution comprising at least one salt at a density of about 10 pounds per gallon or more; and
   a crystallization point suppressant consisting essentially of one or more low molecular weight water-soluble organic compounds other than methanol in an amount effective to suppress said crystallization point;
   wherein said low molecular weight organic compound is selected from the group consisting of ethylene glycols and propylene glycols having a molecular weight up to about 800.

2. A brine comprising:
   an aqueous solution comprising at least one salt at a density of about 10 pounds per gallon or more; and
   a crystallization point suppressant consisting essentially of one or more low molecular weight water-soluble organic compounds selected from the group consisting of ethylene glycol, tripropylene glycol bottoms, and combinations thereof, said low molecular weight organic compound being present in an amount effective to suppress said crystallization point.

3. The brine of claim 2 wherein said crystallization point comprises a First Crystal to Appear (FCTA) temperature and, at said given pressure and density, said FCTA temperature is less than an unsuppressed FCTA temperature experienced in the absence of said amount of said one or more low molecular weight water-soluble organic compounds.

4. A brine selected from the group consisting of a completion fluid, a perforating fluid, a packer fluid, and a drill-in fluid comprising:
   an aqueous solution comprising at least one salt at a density of about 10 pounds per gallon or more; and
   a crystallization point suppressant consisting essentially of one or more low molecular weight water-soluble organic compounds other than methanol in an amount effective to suppress said crystallization point;
   wherein said at least one low molecular weight water-soluble organic compound is selected from the group consisting of ethylene glycol, tripropylene glycol bottoms, and combinations thereof.

5. A brine selected from the group consisting of a completion fluid, a perforating fluid, a packer fluid, and a drill-in fluid comprising:
   an aqueous solution comprising at least one salt at a density of about 10 pounds per gallon or more; and
   a crystallization point suppressant consisting essentially of one or more low molecular weight water-soluble organic compounds other than methanol in an amount effective to suppress said crystallization point;
   wherein said low molecular weight organic compound is selected from the group consisting of ethylene glycols, diethylene glycols, triethylene glycols, tetraethylene glycols, propylene glycols, dipropylene glycols, tripropylene glycols, and tetrapropylene glycols, polyethylene oxides, polypropylene oxides, and copolymers of polyethylene oxides and polypropylene oxides, polyethylene glycol ethers, polypropylene glycol ethers, polyethylene oxide glycol ethers, polypropylene oxide glycol ethers, and polyethylene oxide/polypropylene oxide glycol ethers.

6. A brine selected from the group consisting of a completion fluid, a perforating fluid, a packer fluid, and a drill-in fluid comprising:
   an aqueous solution comprising at least one salt at a density of about 10 pounds per gallon or more; and
   a crystallization point suppressant consisting essentially of one or more low molecular weight water-soluble organic compounds other than methanol in an amount effective to suppress said crystallization point;
   wherein said low molecular weight organic compound is selected from the group consisting of carbohydrates and derivatives thereof having a molecular weight of about 800 or less.

7. A brine selected from the group consisting of a completion fluid, a perforating fluid, a packer fluid, and a drill-in fluid comprising:
   an aqueous solution comprising at least one salt at a density of about 10 pounds per gallon or more; and
   a crystallization point suppressant consisting essentially of one or more low molecular weight water-soluble organic compounds other than methanol in an amount effective to suppress said crystallization point;
   wherein said low molecular weight organic compound is selected from the group consisting of carbohydrates and derivatives thereof having a molecular weight of about 800 or less, selected from the group consisting of monosaccharides, disaccharides, and polysaccharides.

8. A method of suppressing the crystallization point of a brine selected from the group consisting of a completion fluid, a perforating fluid, a packer fluid, and a drill-in fluid, said brine comprising at least one salt at a density of about 10 pounds per gallon or more, said method comprising adding to said brine an amount of a low molecular weight water soluble organic compound other than methanol effective to suppress said crystallization point.

9. The method of claim 8 wherein said brine is a completion brine.

10. The method of claim 8 wherein said crystallization point comprises a First Crystal to Appear (FCTA) temperature and, at said given pressure and density, said FCTA temperature is less than an unsuppressed FCTA temperature experienced in the absence of said amount of said one or more low molecular weight water-soluble organic compounds.

11. The method of claim 8 wherein said low molecular weight water-soluble compound is selected from the group consisting of organic alcohols other than methanol, polyols, glycols, polyglycols, polyalkyleneoxides, alkyleneoxide copolymers, alkylene glycol ethers, polyalkyleneoxide glycol ethers, carbohydrates, amino acids, amino sulfonates, salts of any of the foregoing compounds, and combinations of the foregoing compounds.

12. The method of claim 10 wherein said low molecular weight water-soluble compound is selected from the group consisting of organic alcohols other than methanol, polyols, glycols, polyglycols, polyalkyleneoxides, alkyleneoxide copolymers, alkylene glycol ethers, polyalkyleneoxide glycol ethers, carbohydrates, amino acids, amino sulfonates, salts of any of the foregoing compounds, and combinations of the foregoing compounds.

13. The method of claim 9 wherein said low molecular weight water-soluble compound is selected from the group consisting of organic alcohols other than methanol, polyols, glycols, polyglycols, polyalkyleneoxides, alkyleneoxide copolymers, alkylene glycol ethers, polyalkyleneoxide glycol ethers, carbohydrates, amino acids, amino sulfonates, salts of any of the foregoing compounds, and combinations of the foregoing compounds.

14. The method of claim 8 wherein said low molecular weight water soluble organic compound is selected from the group consisting of ethylene glycol and propylene glycol bottoms, and combinations thereof.

15. The method of claim 10 wherein said low molecular weight water soluble organic compound is selected from the group consisting of ethylene glycol and propylene glycol bottoms, and combinations thereof.

16. The method of claim 9 wherein said low molecular weight water soluble organic compound is selected from the group consisting of ethylene glycol and propylene glycol bottoms, and combinations thereof.

17. The method of claim 8 wherein said low molecular weight organic compound is an organic alcohol selected from the group consisting of organic alcohols other than methanol, salts thereof, and derivatives thereof having a molecular weight of up to 200.

18. The method of claim 10 wherein said low molecular weight organic compound is an organic alcohol selected from the group consisting of organic alcohols other than methanol, salts thereof, and derivatives thereof having a molecular weight of up to 200.

19. The method of claim 9 wherein said low molecular weight organic compound is an organic alcohol selected from the group consisting of organic alcohols other than methanol, salts thereof, and derivatives thereof having a molecular weight of up to 200.

20. The method of claim 8 wherein said low molecular weight water soluble compound has a molecular weight of up to 800 and is selected from the group consisting of ethylene glycols, polyethylene glycols, polyethylene glycol ethers, glycerols, and combinations thereof.

21. The method of claim 10 wherein said low molecular weight water soluble compound has a molecular weight of up to 800 and is selected from the group consisting of ethylene glycols, polyethylene glycols, polyethylene glycol ethers, glycerols, and combinations thereof.

22. The method of claim 9 wherein said low molecular weight water soluble compound has a molecular weight of up to 800 and is selected from the group consisting of ethylene glycols, polyethylene glycols, polyethylene glycol ethers, glycerols, and combinations thereof.

23. The method of claim 14 wherein said ethylene glycol and propylene glycol derivatives in said propylene glycol bottoms have a molecular weight up to about 200.

24. The method of claim 15 wherein said ethylene glycol and propylene glycol derivatives in said propylene glycol bottoms have a molecular weight up to about 200.

25. The method of claim 16 wherein said ethylene glycol and propylene glycol derivatives in said propylene glycol bottoms have a molecular weight up to about 200.

26. The method of claim 8 wherein said low molecular weight organic compound is selected from the group consisting of ethylene glycols, diethylene glycols, triethylene glycols, tetraethylene glycols, propylene glycols, dipropylene glycols, tripropylene glycols, and tetrapropylene glycols, polyethylene oxides, polypropylene oxides, and copolymers of polyethylene oxides and polypropylene oxides, polyethylene glycol ethers, polypropylene glycol ethers, polyethylene oxide glycol ethers, polypropylene oxide glycol ethers, and polyethylene oxide/polypropylene oxide glycol ethers.

27. The method of claim 10 wherein said low molecular weight organic compound is selected from the group consisting of ethylene glycols, diethylene glycols, triethylene glycols, tetraethylene glycols, propylene glycols, dipropylene glycols, tripropylene glycols, and tetrapropylene glycols, polyethylene oxides, polypropylene oxides, and copolymers of polyethylene oxides and polypropylene oxides, polyethylene glycol ethers, polypropylene glycol ethers, polyethylene oxide glycol ethers, polypropylene oxide glycol ethers, and polyethylene oxide/polypropylene oxide glycol ethers.

28. The method of claim 9 wherein said low molecular weight organic compound is selected from the group consisting of ethylene glycols, diethylene glycols, triethylene glycols, tetraethylene glycols, propylene glycols, dipropylene glycols, tripropylene glycols, and tetrapropylene glycols, polyethylene oxides, polypropylene oxides, and copolymers of polyethylene oxides and polypropylene oxides, polyethylene glycol ethers, polypropylene glycol ethers, polyethylene oxide glycol ethers, polypropylene oxide glycol ethers, and polyethylene oxide/polypropylene oxide glycol ethers.

29. The method of claim 8 wherein said low molecular weight organic compound is a carbohydrate having a molecular weight of about 800 or less.

30. The method of claim 10 wherein said low molecular weight organic compound is a carbohydrate having a molecular weight of about 800 or less.

31. The method of claim 9 wherein said low molecular weight organic compound is a carbohydrate having a molecular weight of about 800 or less.

32. The method of claim 29 wherein said carbohydrates are selected from the group consisting of monosaccharides, disaccharides, and polysaccharides.

33. The method of claim 30 wherein said carbohydrates are selected from the group consisting of monosaccharides, disaccharides, and polysaccharides.

34. The method of claim 31 wherein said carbohydrates are selected from the group consisting of monosaccharides, disaccharides, and polysaccharides.

35. A method for suppressing crystallization of water soluble salt from a brine, said method comprising:

providing a brine comprising at least one water soluble salt at a density of at least 10 pounds per gallon; and providing said brine with a crystallization suppressant in an amount effective to suppress said point, said crystallization suppressant being selected from the group consisting of ethylene glycol, tripropylene glycol bottoms, and a combination thereof.

36. The method of claim 35 wherein said amount is about 1 wt % or more.

37. The method of claim 35 wherein said amount is at least 10 wt % or more.

38. The method of claim 35 wherein said amount is from about 10 to about 80 wt %.

39. The method of claim 35 wherein said amount is from about 10 to about 30 wt %.

40. A method for suppressing crystallization of water soluble salt from a brine selected from the group consisting of a completion fluid, a perforating fluid, a packer fluid, and a drill-in fluid, said method comprising:
   providing a clear brine comprising at least one water soluble salt at a density of at least 10 pounds per gallon; and
   providing said brine with a crystallization suppressant comprising an amount of at least one low molecular weight water-soluble organic compound effective to suppress said point, said low molecular weight water-soluble organic compound being selected from the group consisting of polyols, glycols, polyglycols, polyalkyleneoxides, alkyleneoxide copolymers, alkylene glycol ethers, polyalkyleneoxide glycol ethers, amino acids, amino sulfonates, salts of any of the foregoing compounds, and combinations of the foregoing compound.

41. The method of claim 40 wherein said amount is about 1 wt % or more.

42. The method of claim 40 wherein said amount is at least 10 wt % or more.

43. The method of claim 40 wherein said amount is from about 10 to about 80 wt %.

44. The method of claim 40 wherein said amount is from about 10 to about 30 wt %.

45. The method of claim 40 wherein said low molecular weight organic compound is selected from the group consisting of ethylene glycols, diethylene glycols, triethylene glycols, tetraethylene glycols, propylene glycols, dipropylene glycols, tripropylene glycols, and tetrapropylene glycols, polyethylene oxides, polypropylene oxides, and copolymers of polyethylene oxides and polypropylene oxides, polyethylene glycol ethers, polypropylene glycol ethers, polyethylene oxide glycol ethers, polypropylene oxide glycol ethers, and polyethylene oxide/polypropylene oxide glycol ethers.

46. The method of claim 40 wherein said low molecular weight water soluble compound has a molecular weight of up to 800 and is selected from the group consisting of ethylene glycols, polyethylene glycols, polyethylene glycol ethers, glycerols, and combinations thereof.

47. A method for suppressing crystallization of water soluble salt from a brine, said method comprising:
   providing a brine comprising at least one water soluble salt at a density such that, where no crystallization suppressant is present in said brine, said water soluble salt crystallizes out of said brine at a point comprising a given temperature and pressure; and
   providing said brine with a crystallization suppressant comprising tripropylene glycol bottoms in an amount effective to suppress said point.

48. The method of claim 47 wherein said amount is about 1 wt % or more.

49. The method of claim 47 wherein said amount is at least about 10 wt % or more.

50. The method of claim 47 wherein said amount is from about 10 to about 80 wt %.

51. The method of claim 47 wherein said amount is from about 10 to about 30 wt %.

52. A method for suppressing crystallization of water soluble salt from a brine, said method comprising:
   providing a brine comprising at least one water soluble salt at a density of at least 10 pounds per gallon; and
   providing said brine with a crystallization suppressant comprising ethylene glycol in an amount effective to suppress said point.

53. The method of claim 52 wherein said amount is about 1 wt % or more.

54. The method of claim 52 wherein said amount is at least 10 wt % or more.

55. The method of claim 52 wherein said amount is from about 10 to about 80 wt %.

56. The method of claim 52 wherein said amount is from about 10 to about 30 wt %.

57. A method for suppressing crystallization of water soluble salt from a brine, said method comprising:
   providing a brine comprising at least one water soluble salt at a density such that, where no crystallization suppressant is present in said brine, said water soluble salt crystallizes out of said brine at a point comprising a given temperature and pressure; and
   providing said brine with a crystallization suppressant comprising a combination of ethylene glycol and tripropylene glycol bottoms in an amount effective to suppress said point.

58. The method of claim 57 wherein said amount is about 1 wt % or more.

59. The method of claim 57 wherein said amount is at least 10 wt % or more.

60. The method of claim 57 wherein said amount is from about 10 to about 80 wt %.

61. The method of claim 57 wherein said amount is from about 10 to about 30 wt %.

62. A method for suppressing crystallization of water soluble salt from a brine, said method comprising:
   providing a brine comprising at least one water soluble salt at a density of at least 10 pounds per gallon; and
   providing said brine with a crystallization suppressant in an amount effective to suppress said point, said crystallization suppressant being selected from the group consisting of ethylene glycol, tripropylene glycol bottoms, and a combination thereof.

63. The method of claim 62 wherein said amount is 1 wt % or more.

64. The method of claim 62 wherein said amount is 10 wt % or more.

65. The method of claim 62 wherein said amount is from 10 to 80 wt %.

66. The method of claim 62 wherein said amount is from 10 to 30 wt %.

67. A method of suppressing the crystallization of water soluble salt from a brine comprising:
   providing a brine comprising at least one water soluble salt at a density of at least 10 pounds per gallon; and
   providing said brine with a crystallization suppressant in an amount effective to suppress said point, said crystallization suppressant being selected from the group consisting of organic alcohols selected from the group consisting of ethanol, propanol, and glycols thereof having a molecular weight of up to 200.

68. The method of claim 67 wherein said amount is 1 wt % or more.

69. The method of claim 67 wherein said amount is 10 wt % or more.

70. The method of claim 67 wherein said amount is from 10 to 80 wt %.

71. The method of claim 67 wherein said amount is from 10 to 30 wt %.

72. The method of claim 47 wherein said density is about 10 pounds per gallon or more.

73. The method of claim 48 wherein said density is about 10 pounds per gallon or more.

74. The method of claim 49 wherein said density is about 10 pounds per gallon or more.

75. The method of claim 50 wherein said density is about 10 pounds per gallon or more.

76. The method of claim 51 wherein said density is about 10 pounds per gallon or more.

77. The method of claim 57 wherein said density is about 10 pounds per gallon or more.

78. The method of claim 58 wherein said density is about 10 pounds per gallon or more.

79. The method of claim 59 wherein said density is about 10 pounds per gallon or more.

80. The method of claim 60 wherein said density is about 10 pounds per gallon or more.

81. The method of claim 61 wherein said density is about 10 pounds per gallon or more.

* * * * *